United States Patent [19]

Hamrin

[11] Patent Number: 4,765,667

[45] Date of Patent: Aug. 23, 1988

[54] LIFTING HOOK

[76] Inventor: Torbjorn Hamrin, Norra Kungsgatan 23, 803 52 Gavle, Sweden

[21] Appl. No.: 95,057

[22] Filed: Sep. 9, 1987

[30] Foreign Application Priority Data

Jan. 14, 1986 [SE] Sweden ................................ 8600140

[51] Int. Cl.[4] ........................... B66C 1/36; F16B 45/02

[52] U.S. Cl. ................................ 294/82.33; 294/82.2

[58] Field of Search .................... 294/82.33, 82.2, 82.7, 294/82.1, 82.24, 82.31; 24/241 P, 241 R, 241 S, 241 SB, 241 PP, 241 PS, 231 A

[56] References Cited

U.S. PATENT DOCUMENTS 2,705,357 4/1955 Davick ................................ 294/82.2

4,026,594 5/1977 Kumpulainen ................... 294/82.33

*Primary Examiner*—James B. Marbert

*Attorney, Agent, or Firm*—Cohn, Powell & Hind

[57] ABSTRACT

A lifting hook for automatic releases of a load held by a lifting hook comprises a hook member (1) with a hooking portion (2) and a suspension portion (3) as well as an intermediate portion (4) between said portions, a suspension means (5) which at least when the hooking portion (2) is loaded is pivoted in the suspension portion (3) and suspended by a traction element, e.g. a chain or the like. The intermediate portion (4) comprises a slot along substantially its whole length, which slot receives the bearing (8) of the suspension means (5), so that this bearing is displaceable in said slot (7). The hook member (1) is arranged to, when the traction element is unloaded followed by a lifting of the hook member (1), be turned from an ordinary load-carrying position to a load-releasing position, preferably 180°, by displacement of the center of gravity of the lifting hook.

11 Claims, 11 Drawing Sheets

LIFTING HOOK

The present invention concerns a lifting hook for automatic release of a load held by the lifting hook, comprising a hook member with a hooking portion and a suspension portion as well as an intermediate portion between said portions, a suspension means which at least when the hooking portion is loaded is pivoted in the suspension portion and suspended by a traction element, e.g. a chain or the like, and a latch, which is pivoted in a bearing arranged in the suspension portion and which obstructs the opening of the hook, said intermediate portion comprising, preferably all along its length, a slot receiving the bearing of the suspension means, so that this is displaceable in said slot and so that the hook member, when the traction element is unloaded followed by a lifting of the hook member, is turned from an ordinary loadcarrying position to a load-releasing position by displacement of the centre of gravity of the lifting hook.

A lifting hook of the type mentioned above is described in the English patent No. 1 284 851. However, this lifting hook comprises some disadvantages. The greatest disadvantage of this lifting hook consists in the fact that the hooking of a load is comparatively complicated, since the whole hook member has to be pivoted upwardly/backwardly at the same time as the means closing the hook opening has to be held aside when the load lug is inserted. Another disadvantage of this known lifting hook consists in the fact that the location of the centre of gravity is unfavourable, through which it is necessary to provide the hook with an assisting turning means, which is arranged in the lower portion of the hook and consists of a rope or the like for causing the turning to take place, in order to obtain lifting hook fairly safe in operation. However, this unfavourable weight distribution of the hook cannot simply be modified, since this would imply a still more unstable position of the lifting hook when this is hanging freely.

SUMMARY OF THE INVENTION

The object of the present invention is to provide a lifting hook of the kind mentioned above, which overcomes the drawbacks and the disadvantages of the known lifting hook mentioned above.

This object is obtained according to the invention by the fact that the latch is affected by a spring in the closing direction, that the bearing of the latch is displaceable in a slot in the suspension portion of the hook member and affected by the spring in a direction towards an end position in the slot, so that the latch, in the non-load-releasing position, resiliently bears against the suspension means, and so that the latch is hanging freely in the load-releasing position.

A lifting hook according to the invention does in this way give the advantage to enable a very easy hooking of the load on the hook. Another advantage consists in the fact that the lifting hook is very stable in a position before the lifting hook is loaded.

Further objects and advantages will appear from the appended dependent claims.

BRIEF DESCRIPTION OF THE DRAWINGS

With reference to the drawings the invention will hereinafter be described more in detail by way of embodiment examples.

In the drawings.

DETAILED DESCRIPTION OF PREFERRED EMBODIMENTS

Figure 1:
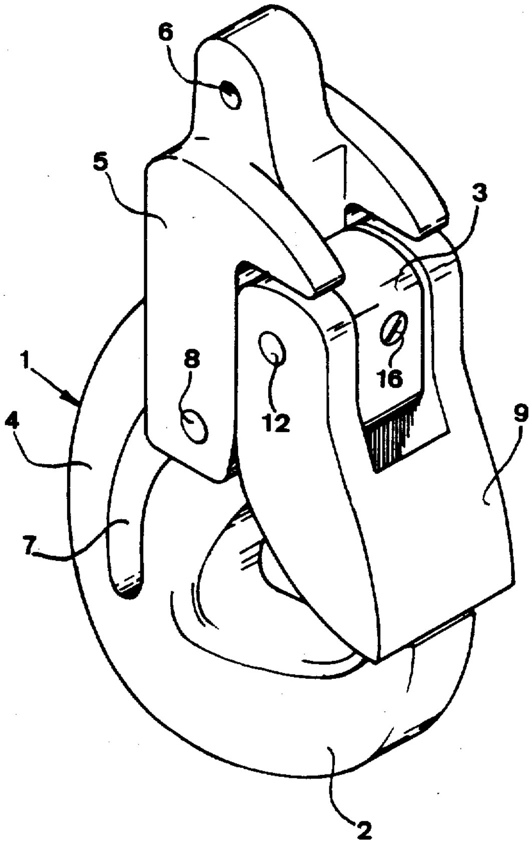
FIG. 1 is a perspective view obliquely from above of the lifting hook according to the invention, in a state without load and with the latch in closing position.

A half-automatic lifting hook for automatic release of objects held by the lifting hook is shown in FIGS. 1–5. The lirting hook comprises a hook member 1 with a hooking portion 2 and a suspension portion 3 as well as an intermediate portion 4 between said portions 2, 3, a suspension means 5, which when the hooking portion 2 is loaded (see Fig. 3) is pivoted in the suspension portion 3 and suspenced by a traction element in the form of e.g. a chain engaging the hole 6.

The inwardly turned face 24 of the hooking portion 2 has a flat- section 25 which is located substantially horizontally when the lifting hook is lifted. Thanks to this no unsuitable uneven load on the band will occur in the present lifting hook during the lifting of flexible wide bands, but the band will be loaded uniformly over its whole width.

The lifting hook is provided with chamferings 27 and smoothed guiding faces 26 in order to avoid undesireable hookings.

The intermediate portion 4 of the hook member 1 is along its substantially entire length provided with a slot 7. The slot 7 extends right to a bearing 8 of the suspension means 5 and receives this bearing so that it is displaceable in said slot 7. The hook member 1 is then arranged to, when the traction element is unloaded, followed by a lifting of the hook member 1, be turned from an ordinary load-carrying position (FIG. 3) to a load-releasing position (FIG. 5) by displacement of the centre of gravity of the lifting hook.

Figure 2:
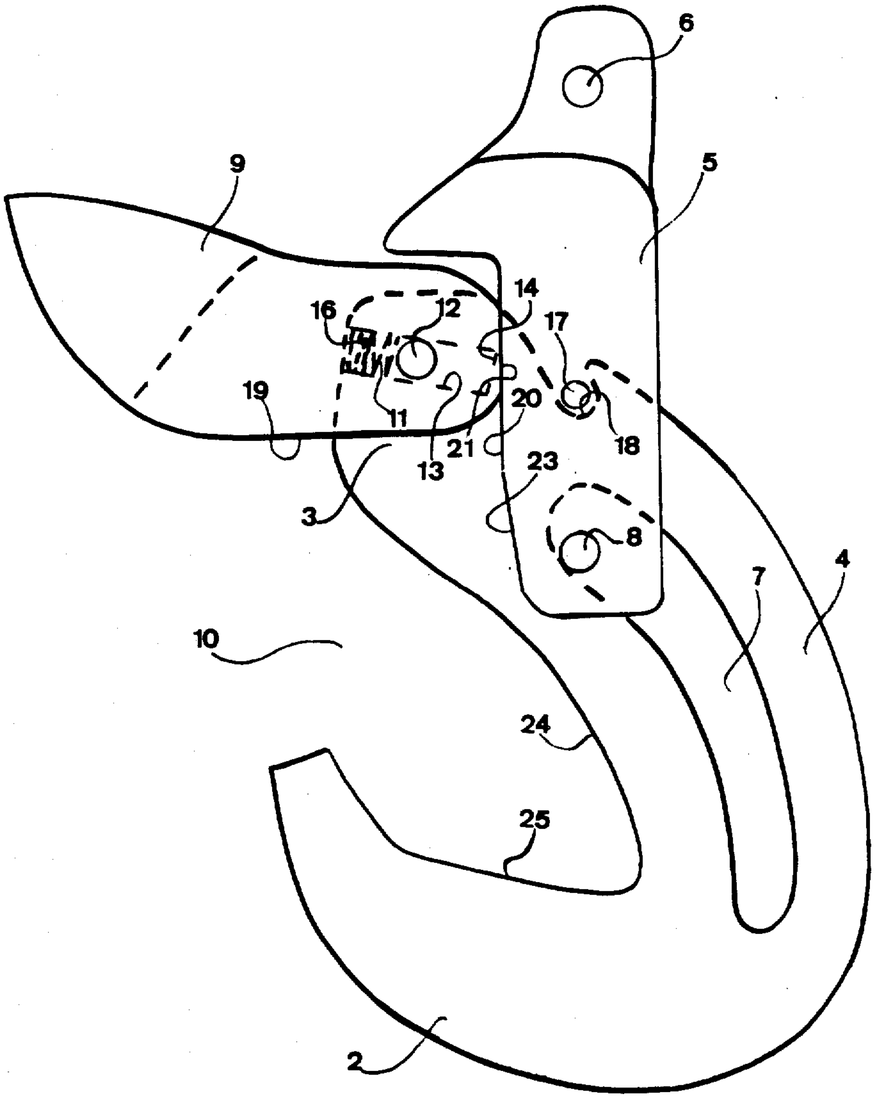
FIG. 2 is a side-elevation of the lifting hook according to FIG. 1, but with the latch in a position opened for hooking of the load.
Figure 3:
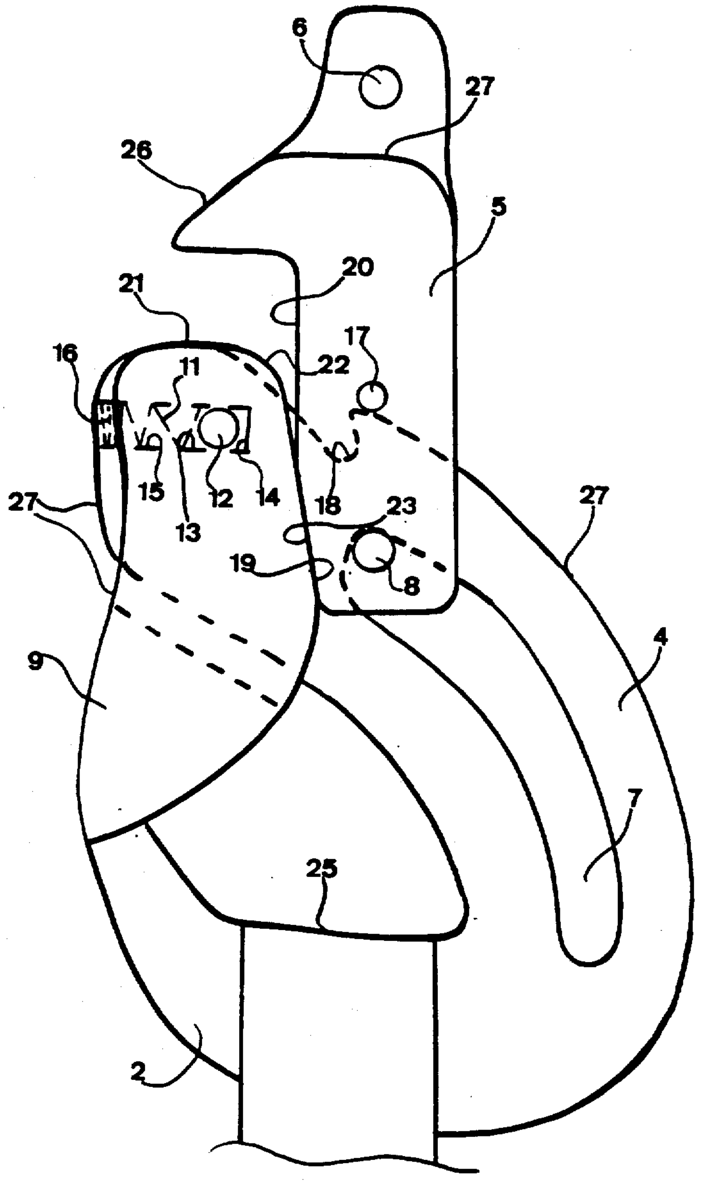
FIG. 3 is a side-elevation of the lifting hook according to FIG. 2, but with load and with the latch in the closing position.

In the embodiment of the present invention shown in FIGS. 1–5 the lifting hook comprises a latch 9, which obstructs the opening 10 of the hook and which is pivoted in the suspension portion and affected by a spring 11 in the closing direction (see FIG. 1 and 3). The bearing 12 of the latch 9 is arranged generally in parallel with the bearing 8 of the suspension means and displaceable in a slot 13 in the suspension portion 3 of the hook member 1 and affected by the spring 11 towards an end position 14 in the slot 13, since the spring 11, which has the shape of a helical compression spring, is received within a hole 15 arranged in the suspension portion 3 and in alignment with the extension direction of the slot 13. Through this the spring 11 acts between the bearing 12 and a stop member 16 screwed into the hole 15, the spring force generated by the spring being adjustable by means of said stop member through modification of the screwing depth in the suspension portion 3.

The suspension means 5 comprises a pin 17 which is parallel to the bearings 8 and 12 and is arranged to go into engagement with a recess 18 in the suspension portion 3 of the hook member 1. When the pin 17 is in engagement with the recess 18 the suspension means 5 is without pivotability with respect to the suspension portion 3 and the spring 11 holds the pin 17 in the recess 18 owing to the fact that the latch 9 resiliently bears against the suspension means 5. Thus, the spring 11 holds the three essential parts (the hook member 1, the latch 9 and the suspension means 5) together and prevents them from moving with respect to each other when the pin 17 is in engagement with the recess 18.

The latch 9 comprises a first edge side 19 which resiliently bears against a first edge surface 20 of the suspension means 5 when the latch is in the closing position, and a second edge surface 21, which, when the latch 9 is in the position opened for hooking of a load, resiliently bears against the first edge surface 20 of the suspension means 5, when the pin 17 is in engagement with the recess 18. The latch 9 is operated by hand between the closed position and the position opened for hooking of a load. The edge surfaces 19, 21 of the latch 9 and the transition portion 22 between these are so designed that the spring is most compressed when the transition portion bears against the first edge surface 20 of the suspension means 5 and that the latch 9 is self-holding in a position open for hooking of a load (see FIG. 2).

The suspension means 5 is pivotable with respect to the suspension portion 3, when the pin 17 is out of engagement with the recess 18, and the first edge surface 19 of the latch 9 is then (see FIG. 3) bearing against a second edge surface 23 of the suspension means 5 as long as the traction element is not unloaded and stretched again.

The lifting hook described in FIG. 1–5 operates in the following way. In a state shown in FIG. 1 the lifting hook is prepared to be employed for a lift. The latch 9 of the lifting hook is then moved by hand to the position shown in FIG. 2. Through this it is now possible, without holding the latch 9, to introduce a leash, a band or the like through the hook opening 10 for receiving it on the hooking portion 2. After this the latch 9 is moved down to the closing position and the lifting hook is lifted through the traction element, through which (see FIG. 3) the pin 17 goes out of engagement with the recess 18. The latch 9 is in spite of this in the closing position, since the spring 11 is pressing the first edge surface 19 of the latch against the second edge surface 23 of the suspension means 5. After the load has been moved to a determined place the lifting hook is lowered so that the traction element is unloaded because the hooking portion of the hook member 1 is laid against the load. Thanks to the location of the centre of gravity of the lifting hook this implies a displacement of the hook member 1 along its slot 7 and a turning of the hook member 1 of substantially 180° from the position in FIG. 3 through the position in FIG. 4 and to the position in FIG. 5, where the hook opening 10 is turned substantially straight downwardly, so that the leash or the chain easily can slide out of the hook opening 10, since the latch is hanging free right downwardly without influence by the spring in any direction about the bearing 12. The bearing 12 is at this moment in its end position 14.

Figure 4:
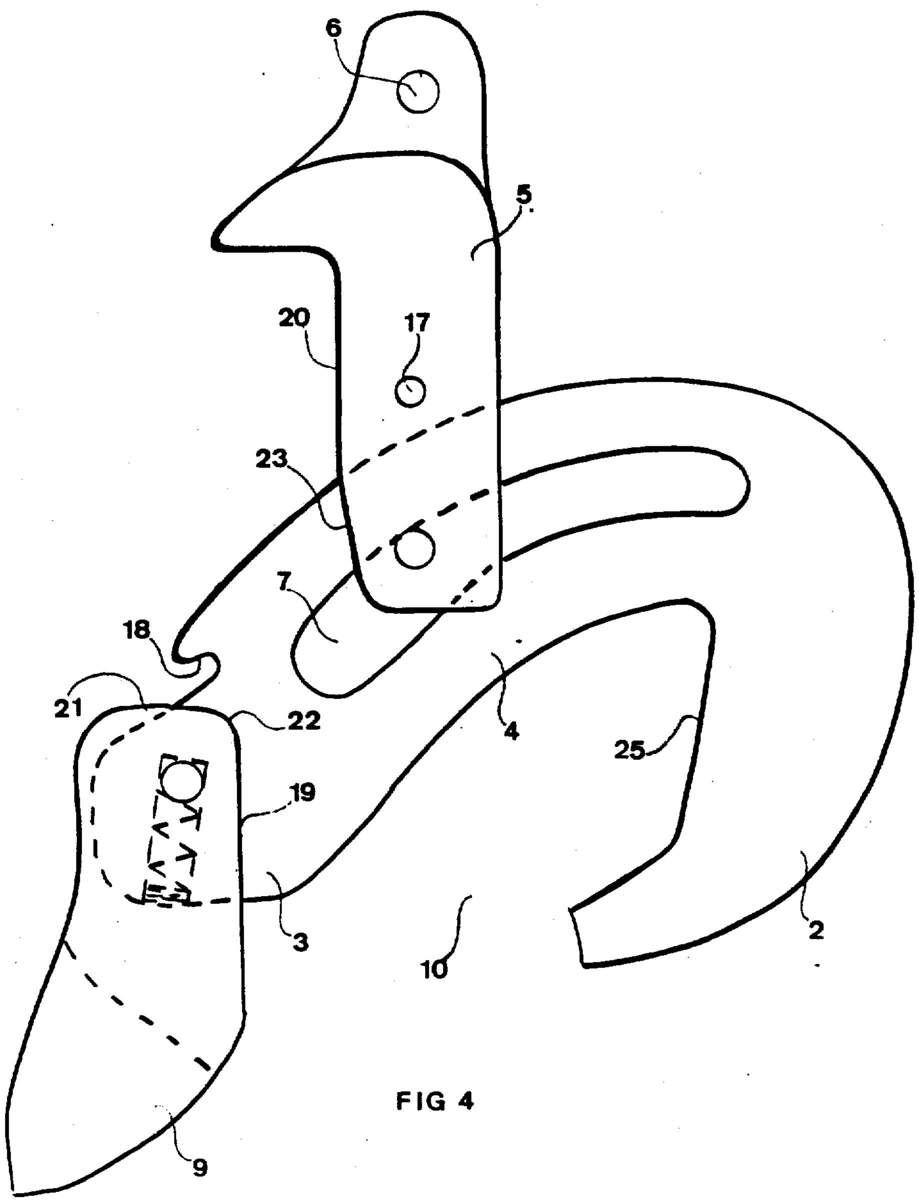
FIG. 4 is a side-elevation of the lifting hook without load and with the hook member in the beginning of its turning.
Figure 5:
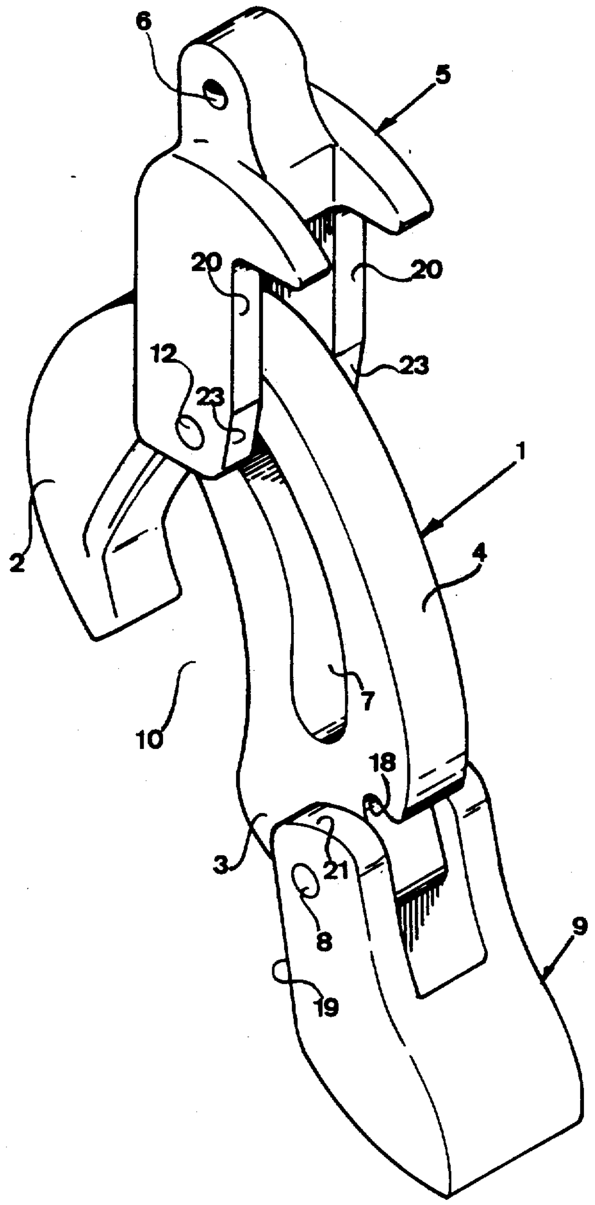
FIG. 5 is a perspective view obliquely from above of the lifting hook according to the invention, in a state without load and with the latch in the releasing position and with the hook member completely turned.
Figure 6:
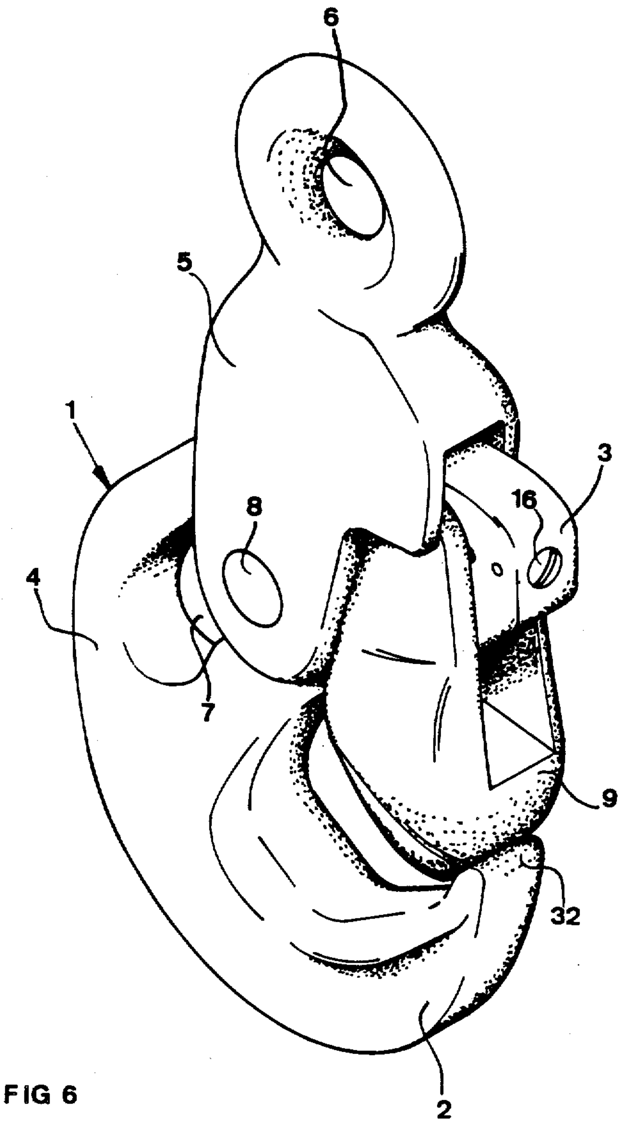
FIG. 6 is a perspective view obliquely from above of a second embodiment of the lifting hook according to the invention, in a state without load and with the latch in a closing position.
Figure 7:
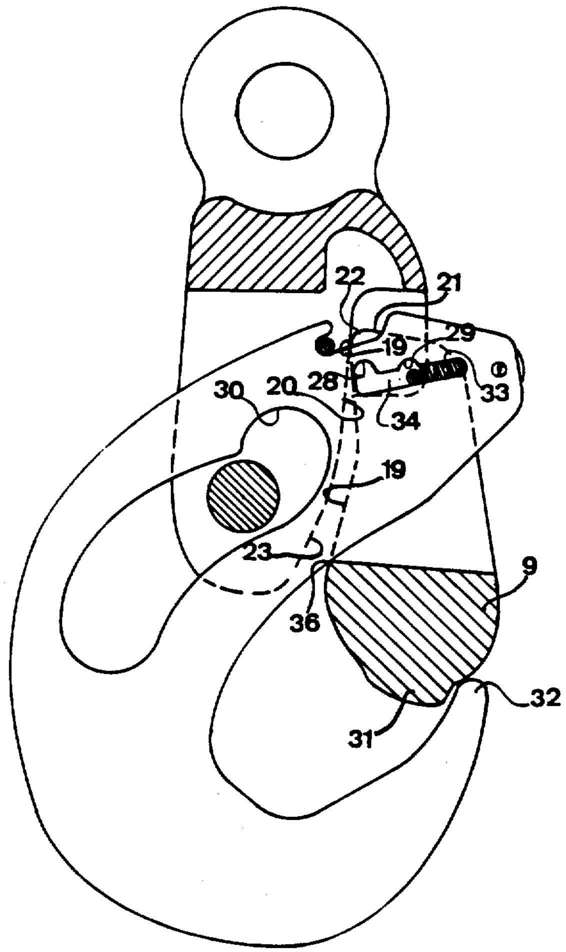
FIG. 7 is a lateral cross section view of the lifting hook according to FIG. 6 along one lateral surface of the hook member, with the lifting hook in a state without load and with the latch in the closing position.
Figure 8:
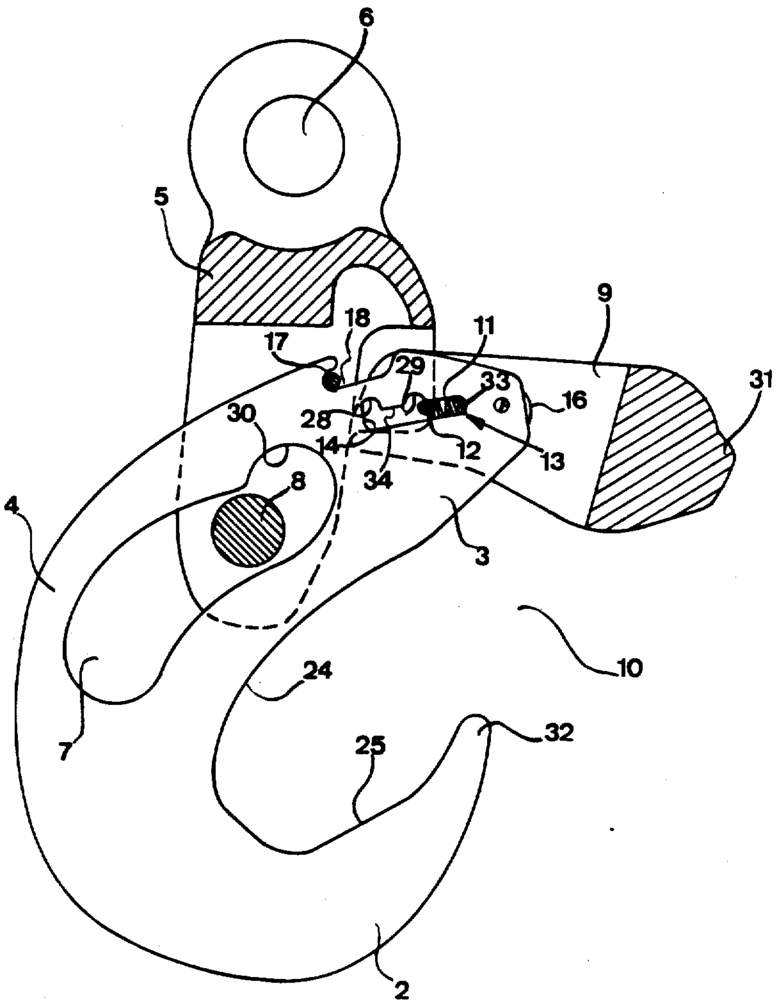
FIG. 8 is a cross section view of the lifting hook according to FIG. 7, but with the latch in the position opened for hooking of a load.

In order to bring the parts 1, 5 and 9 together to the position for receiving a load (see FIG. 2), one has to grasp the hook member 1 by hand and turn it back from the position in FIG. 5 through the position in FIG. 4 to the position in FIG. 3, and insert the pin 17 in the recess 18, as appears from FIG. 2, by compressing the spring 11 and subsequently pivoting the latch 9 up to the position in FIG. 2.

In FIGS. 6–11 another embodiment of the hook according to the invention is shown, where the latch is not only spring-loaded in the closing direction, but also positively locked in the closing position when the lifting hook is lifting a load. This embodiment of the hook according to the invention will only be described as far as it differs from the embodiment of the lifting hook according to the invention already described, and parts in this embodiment which have the same or a similar function as corresponding parts in the embodiment already described will here be numbered in the same way.

The lifting hook according to this embodiment differs from the embodiment previously described by the fact that the slot 13 in one end position 14, towards which the spring 11 tends to press the bearing 12, is widened, so that the bearing 12 gets a play substantially transversely to the extent of the slot. Closer to the other (the second) end position in the slot, i.e. closer to the member 16, there is also a corresponding widened space 29. However, the slot 13 extends beyond this widened space 29 and closer to the member 16. The widened spaces 28, 29 are provided in the upper portion of the slot as it is orientated in the FIGS. 7–9. The slot 7 in the intermediate portion 4 of the hook member 1 has also a widened space 30 in which the bearing 8 of the suspension means is located in the ordinary load-carrying position.

The lifting hook according to this embodiment differs from the embodiment previously described also by the fact that the latch comprises a shoulder portion 31 arranged on the free end of the latch 9. This portion cannot always simply pass the point 32 of the hook member.

Figure 9:
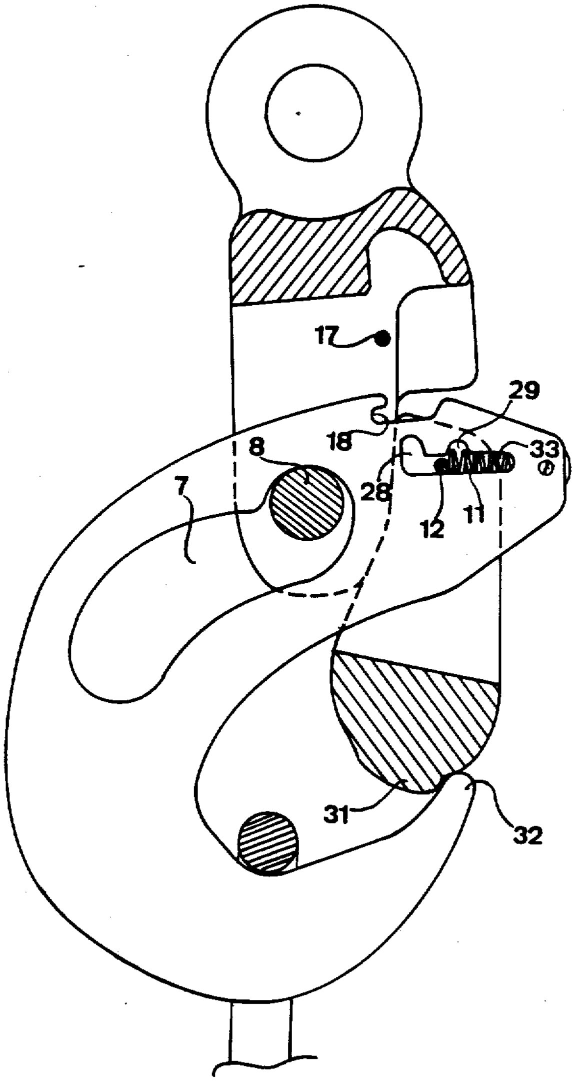
FIG. 9 is a cross section view of the lifting hook according to FIG. 7, but loaded and with the latch in the closing position.
Figure 10:
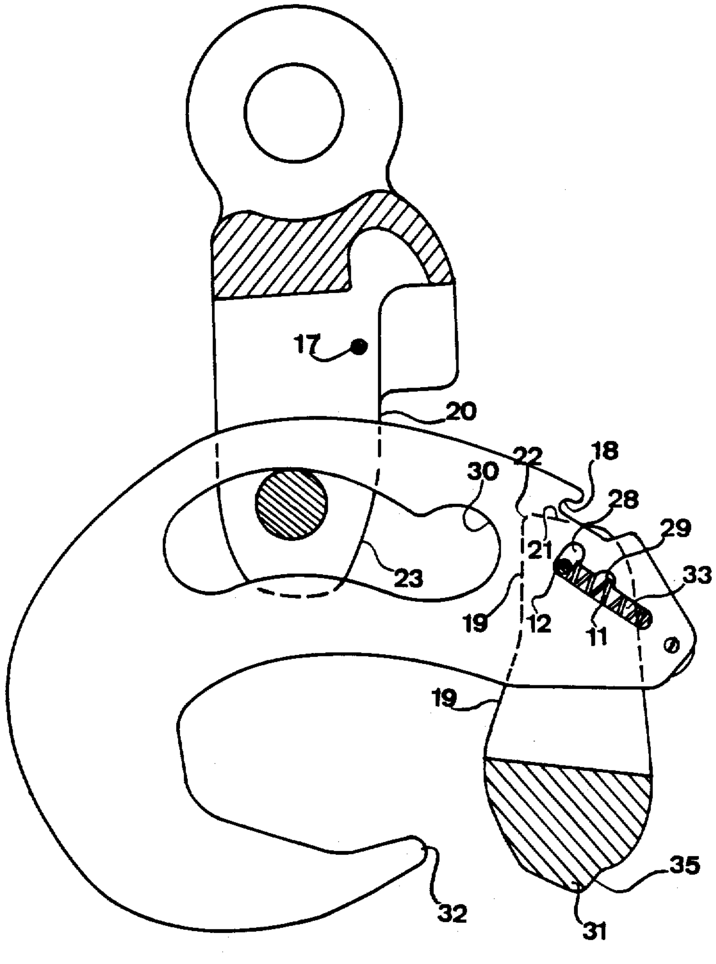
FIG. 10 is a cross section view of the lifting hook without load and with the hook member in the beginning of its turning.
Figure 11:
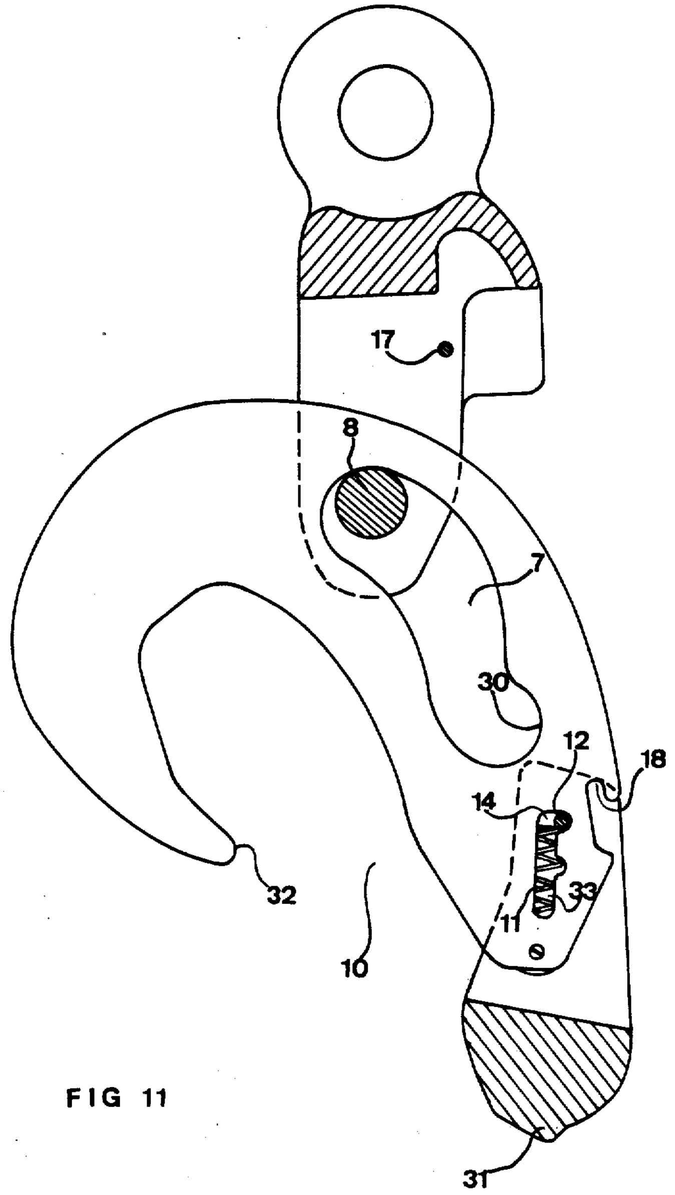
FIG. 11 is a cross section view of the lifting hook with the latch in the releasing position and with the hook member completely turned.

A further difference between the two embodiments consists in the fact that in the embodiment according to FIGS. 6–11 the latch 9 has the edge surface 19 bearing against the edge surface 20 as well as the edge surface 23 on the suspension means 5, when the lifting hook is in the ordinary load-carrying position (see FIG. 9). In the state of the lifting hook in accordance with FIG. 7 there is besides the bearing of the edge surface 20 against the edge surface 19 of the latch, also a portion 36 of the latch 9 bearing against the intermediate part 4 of the lifting hook, so that the closing moment on the latch 9 about the contact surface between the edge surface 19 of the latch 9 and the edge surface 20 of the suspension means 5 on the latch 9 and caused by the spring 11 is counteracted.

The lifting hook described in FIG. 6–11 functions in the following way. In a state shown in FIG. 7 the lifting hook is prepared to be employed for a lifting operation. The latch 9 of the lifting hook is then moved by hand to the position shown in FIG. 8. The latch 9 is arranged to be self-holding in this open position owing to the fact that the edge surface 21 of the latch 9 resiliently bears against the edge surface 20 of the suspension means. The bearing 12 of the latch has during the openirg movement of the latch 9 moved in the direction from the end position 14 towards the member 16. More exactly the bearing 12 has moved from the position shown in FIG. 7 substantially straightly below the widened space 29 in the slot 13 to the space 33 in the slot 13. Thanks to the fact that the edge surfaces 19, 21 of the latch 9 and the transition portion 22 between these are so designed that the spring 11 is mostly compressed when the transition portion 22 bears against the first edge surface of the suspension means 5, so that the latch 9 is self-holding in the position opened for hooking of a load, also a certain end movement of the bearing 12 in the direction towards the end position 14 is taking place after the transition portion 22 has passed the first edge surface 20 of the suspension means 5. It is now possible to introduce a leash, a band or the like through the hook opening 10 for reception on the hooking portion 2 without holding the latch 9. Subsequently the latch is moved down to the closing position and the latch is then allowed to, beside the pivoting, carry out a lifting movement, since the bearing moves upwardly into the widened space 29, so that the shoulder portion 31 on the latch can pass the hook point 32. After this the lifting hook is lifted through a traction element, through which (see FIG. 9) the pin 17 goes out of engagement with the recess 18, and through which the bearing 8 of the suspension means 5 is lifted upwardly into the widened space 30 in the slot 7 of the hook member 5. During this relative movement between the hook member and the suspension means also a displacement of the bearing 12 from the position of FIG. 7, where it is substantially straight below the widened space 29, to a position between the two widened spaces 28, 29 is taking place. In this position there is no possibility to lift the latch, so that the shoulder portion 31 can pass the point 32 of the hook member, since the slot in the portion 34 between the two widened spaces 28 and 29 receives the bearing 12 without any clearance. In this load-carrying position of the lifting hook as well as in all other positions with exception for the load-releasing position of the lifting hook, the spring 11 presses the latch towards the suspension means 5. In the positions shown by FIG. 7 and 8 the cooperation of the pin 17 with the recess 18 generates the force opposed to the spring 11, while in the position according to FIG. 9 the cooperation of the bearing 8 with the widened space 30 in the slot 7 generates the force acting against the spring 11 and preventing the suspension means and latch from being separated from each other. After the load has been moved to a determined place, the lifting hook is lowered, so that the traction element is unloaded by laying the hooking portion of the hook member 1 on the load or on an underlayer. In doing so the bearing 8 of the suspension means goes out of engagement with the widened space 30 in the slot 7, so that the suspension means and the latch are separated from each other at the same time as the bearing of the suspension means starts to move along the slot 7 and at the same time as the bearing 12 of the latch 9 is pressed in the direction of the end position 14. In this end position 14 the widened space 28 is so arranged that the bearing 12 goes away from the hook point 32 to such an extent, that the shoulder portion 31 of the latch can pass the hook point by the fact that the latch is turned about the bearing 12 and the hook member 1 is turned substantially 180° from the position in FIG. 9 through the position in FIG. 10 and to the position in FIG. 11, where the hook opening 10 is turned substantially right downwardly, so that the leash or the chain can slide out of the hook opening owing to the fact that the latch is hanging freely right downwardly without any essential spring influence in any direction about the bearing 12. The bearing 12 goes away from the hook point 32 and goes up in the widened space 28 owing to the fact that the shoulder portion 31 is provided with an appropriately inclined surface 35 which slides over the hook point 32 through the weight influence of the latch 9. Some assistance can also be obtained through the spring 11 which can be allowed to affect the bearing 12 upwardly in the widened space 28 thanks to the fact that the slot 13 more or less is provided with a guiding part towards the widened space 28. At this automatic turning the latch 9 causes a very favourable displacement of the centre of gravity of the lifting hook, which results in the elimination of the risk of a non-appearance of turning of the hook member.

I claim:

1. A lifting hook for automatic release of a load held by the lifting hook, comprising a hook member (1) with a hooking portion (2) and a suspension portion (3) as well as an intermediate portion (4) between said portions, a suspension means (5) which at least when the hooking portion (2) is loaded is pivoted in the suspension portion (3) and suspended by a traction element, and a latch (9), which is pivoted in a bearing (12) arranged in the suspension portion (3) and which is arranged to close an opening (10) of the hook in order to maintain the load in engagement with the hooking portion, said intermediate portion (4) comprising a slot (7) receiving the bearing (8) of the suspension means (5), so that the bearing is displaceable in said slot (7) and so that the hook member (1). when the traction element is unloaded followed b a lifting of the hook member (1), is turned from an ordinary load-carrying position to a load-releasing position by displacement of the centre of gravity of the lifting hook, wherein the bearing(12) of the latch (9) is displaceable in slot (13) in the suspension portion (3) of the hook member (1) and affected by a spring (11) in a direction towards an end position (14) in the slot (13), so that the latch (9), in the non-load-releasing position, resiliently bears against the suspension means (5), and so that the latch (9) is hanging freely pivotable by means of said bearing (12) in the load-releasing position.

2. The lifting hook accoridng to claim 1, characterized in that the spring (11) is a helicodial compression spring received within a hole (15) arranged in the suspension portion and in alignment with the longitudinal direction of the slot (13), and that the spring (11) is arrange to act between the bearing (12) and a stop member (16) arranged in the hole 3. The lifting hook according to claim 1 or 2, characterized in that the latch (9) comprises a shoulder portion (31) in its free end, and that the latch is displaceably movable with respect to the hook member, so that the shoulder portion (31) can pass the hook point (32).

4. The lifting hook according to claim 3, characterized in that the slot (13) is provided with two widened spaces (28 and 30) in which the bearing (12) of the latch can be received with clearance so as to allow a displacement of the bearing (12) in another direction than the direction of the slot (13).

5. The lifting hook according to claim 4, characterized in that one widened space (28) is arranged near one end region (14) of the slot, that this widened space (28) is arranged to receive the bearing (12) when the resilient bearing of the latch against the suspension means ceases to exist.

6. The lifting hook according to claim 4, characterized in that the second widened space (29) of the slot (13) is arranged close to the other end of the slot (13), that the second widened space (29) is arranged to receive the bearing (12) during a short moment when the hook opening (10) is made free by hand.

7. The lifting hook according to claim 4, characterized in that the latch (9) is without displaceability at an angle to the direction of the slot (13) when the lifting hook is in an ordinary load carrying position, whereby the latch (9) is positively locked in the closing position.

8. The lifting hook according to claim 1, characterized in that the suspension mesn (5) comprises a pin (17) arranged to be receivable in a recess (18) in the suspension portion of the hook member, siad suspension means (5), when the pin (17) is in engagement with the recess (18), being substantially without pivotability with respect to the suspension portion (3).

9. The lifting hook acording to claim 8, characterized in that the spring (11) holds the hook member (1), the suspension means (5) and the latch together and prevents a relative movement between these parts when the pin (17) is in engagement with the recess (18).

10. The lifting hook according to claim 8, characterized in that the pin (17) is arranged to go out of engagement with the recess (18) when the hook member (1) is loaded, whereby the suspension means (5) gets a pivotability with respect to the suspension portion (3).

11. The lifting hook according to claim 1, characterized in that the latch is arranged to be self-holding in a position opened for hooking of a load.

* * * * *

UNITED STATES PATENT AND TRADEMARK OFFICE
CERTIFICATE OF CORRECTION

PATENT NO. : 4,765,667

DATED : August 23, 1988

INVENTOR(S) : Torbjorn Hamrin

It is certified that error appears in the above-identified patent and that said Letters Patent are hereby corrected as shown below: Title page:

Abstract, line 1, delete "releases" and insert --release--.
Column 2, line 54, delete "lirting" and insert --lifting--.
Column 2, line 59, delete "suspenced" and insert --suspended--.
Column 5, line 42 delete "openirg" and insert --opening--.
Column 7, line 37 delete "accoridng" and insert --according--.
Column 7, line 44, delete "arrange" and insert --arranged--.
Column 8, line 29 delete "mesn" and insert --means--.
Column 8, line 31 delete "siad" and insert --said--.
Column 7, line 23 delete "b" and insert --by--.

Signed and Sealed this

Tenth Day of January, 1989

*Attest:*

DONALD J. QUIGG

*Attesting Officer*

*Commissioner of Patents and Trademarks*